United States Patent [19]
Powell, Jr.

[11] Patent Number: 5,597,524
[45] Date of Patent: Jan. 28, 1997

[54] METHOD OF REMOVING FLASH FROM A BLOW MOLDED CONTAINER

[75] Inventor: Ralph B. Powell, Jr., Jackson, Mich.

[73] Assignee: Hoover Universal, Inc., Plymouth, Mich.

[21] Appl. No.: 410,778

[22] Filed: Mar. 27, 1995

[51] Int. Cl.⁶ .................................................. B29C 49/72
[52] U.S. Cl. .......................... 264/536; 264/161; 425/218; 425/527; 425/806; 225/1; 225/93
[58] Field of Search .................................... 264/536, 161; 425/218, 527, 806; 83/17–19, 22, 176, 914; 225/1, 93

[56] References Cited

U.S. PATENT DOCUMENTS

| | | |
|---|---|---|
| 3,295,159 | 1/1967 | Fischer . |
| 3,793,421 | 2/1974 | Paubandt . |
| 4,305,904 | 12/1981 | Black . |
| 4,381,183 | 4/1983 | Bowers et al. . |
| 4,549,066 | 10/1985 | Piccioli et al. ........................ 264/536 |

FOREIGN PATENT DOCUMENTS

| | | | |
|---|---|---|---|
| 757782 | 4/1971 | Belgium ............................. 425/527 |
| 2161246 | 6/1973 | Germany ............................. 264/161 |
| 1167513 | 10/1969 | United Kingdom .................. 264/536 |

Primary Examiner—Catherine Timm
Attorney, Agent, or Firm—Harness, Dickey & Pierce, P.L.C.

[57] ABSTRACT

A method of removing a flash portion from a container molded from an elastomer in which the flash portion is held stationary and the container is either inflated or deflated to increase or decrease the size of the container by moving the container walls whereby the stationary flash portions are torn or at least partially torn from the container walls.

4 Claims, 3 Drawing Sheets

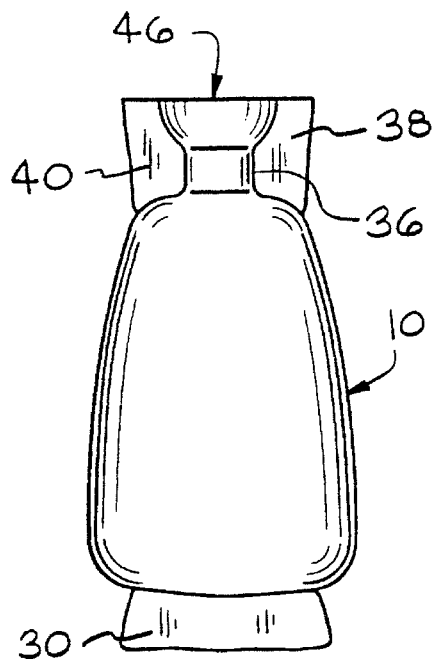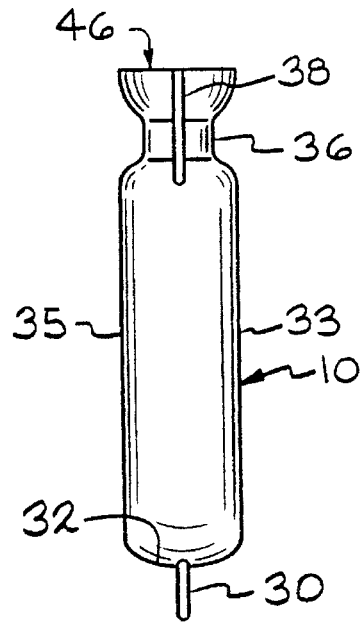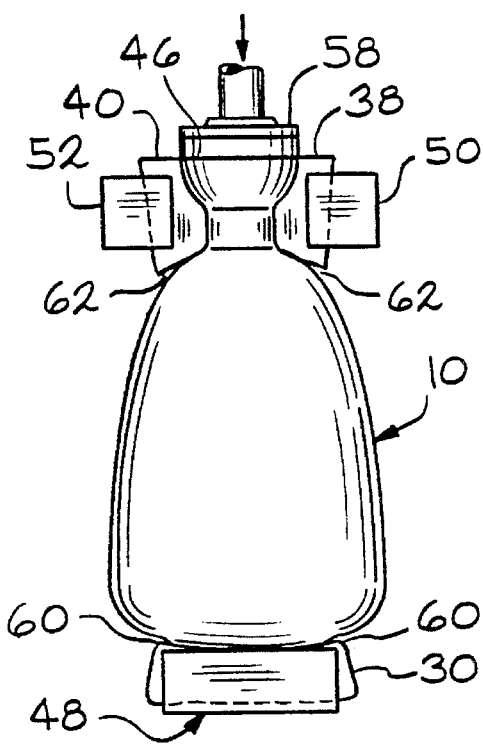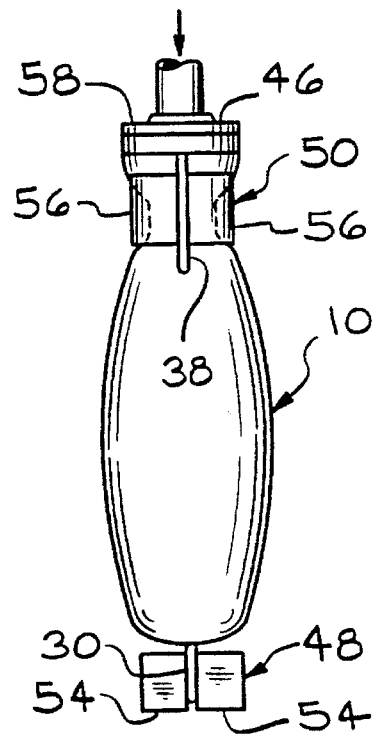

METHOD OF REMOVING FLASH FROM A BLOW MOLDED CONTAINER

BACKGROUND AND SUMMARY OF THE INVENTION

The present invention relates to a method of removing an unwanted flash portion from a blow molded container and in particular to a method in which the flash portion is gripped and held stationary while the container is either inflated or deflated to change the container size whereby the flash portion is at least partially torn from the container.

In the process of blow molding containers or other articles, the articles are formed from an extruded parison that is held between a pair of mating mold halves expanded outwardly to conform to the shape of the mold cavity. After forming the article, the mold halves are separated and the molded article is ejected. It is common for flash or flashing, which refers to a web projecting from the surface of the container, to be formed at the parting line where the mold halves engage the extruded parison. The flashings must be removed in a separate operation, either by hand or by automatic machines.

Various machines and methods have been employed for removing the flashings. One method is to move the molded container along a path in which a knife cuts the flash from the molded container. In another method, a gripping device grasps the flash and pulls it in a direction away from the molded container to tear the flash from the container. These methods both work well in connection with containers that have a fairly high degree of rigidity to enable the container to retain its shape under the force of the cutting knife or the gripping device. However, for containers that are molded of an elastomeric resin, which are not very rigid, it is difficult to both handle each container with automated machinery and to force the container passed a cutting knife in a controlled fashion so as to cut along the thin section joining the flash to the molded container.

Accordingly, it is a principal object of the present invention to provide an improved method for removing an unwanted flash portion from a blow molded container made from an elastomer or other resin exhibiting elastomeric properties.

The method of the present invention utilizes a gripping device to grip the flash portion to hold it stationary. A fluid flow nozzle is inserted into the opening of the container and fluid is either inserted into the container to inflate the container and increase its size, or fluid is withdrawn from the container to deflate the container and reduce its size. The desired effect of changing the container size is to move the container walls while the flash portion is held stationary. This results in at least a partial tearing of the flash portion from the container. If only a portion of the flash is torn away, the tear facilitates subsequent completion of flash removal either by hand or by other automated means. Depending upon the container configuration and the flash location, the flash portion may be entirely removed by this method.

The decision to use container inflation or deflation is primarily dependent upon the particular container being molded. For a container which generally retains its shape, such as an ear syringe, either inflation or deflation can be used to remove the flash portion. However, with a container that is flexible and generally does not retain its shape, such as a hot water bottle, container inflation is the primary method by which the mold flash is removed. Using deflation for a hot water bottle is not practical. The hot water bottle side walls will collapse upon themselves without causing significant movement of the container walls along the parting line where the flash portion is joined to the molded container.

The method of removing an unwanted flash portion from a blow molded plastic container having a predetermined molded size and an opening, and a flash portion joined to the container along the weakened line, comprises the following steps:

1) gripping the flash portion to hold the flash portion stationary;
2) inserting a fluid flow nozzle into the opening in the plastic container; and
3) passing fluid through the nozzle to change the size of the container from the predetermined molded size so that the plastic container is changed in size while the flash portion is held stationary whereby the flash portion is at least partially torn away from the plastic container along the weakened line.

Further objects, features and advantages of the invention will become apparent from a consideration of the following description and the appended claims when taken in connection with the accompanying drawings.

BRIEF DESCRIPTION OF THE DRAWINGS

FIG. 2 is a front elevational view of the molded container upon removal from the mold illustrating the flash portions;

FIG. 3 is a side elevational view of the molded container of FIG. 2;

FIG. 4 is a front elevational view illustrating the flash portions being gripped and held stationary, and the container being inflated to partially tear the flash portion from the container;

FIG. 5 is a side elevational view of the flash removal shown in FIG. 4;

DETAILED DESCRIPTION OF THE PREFERRED EMBODIMENT

Figure 1:
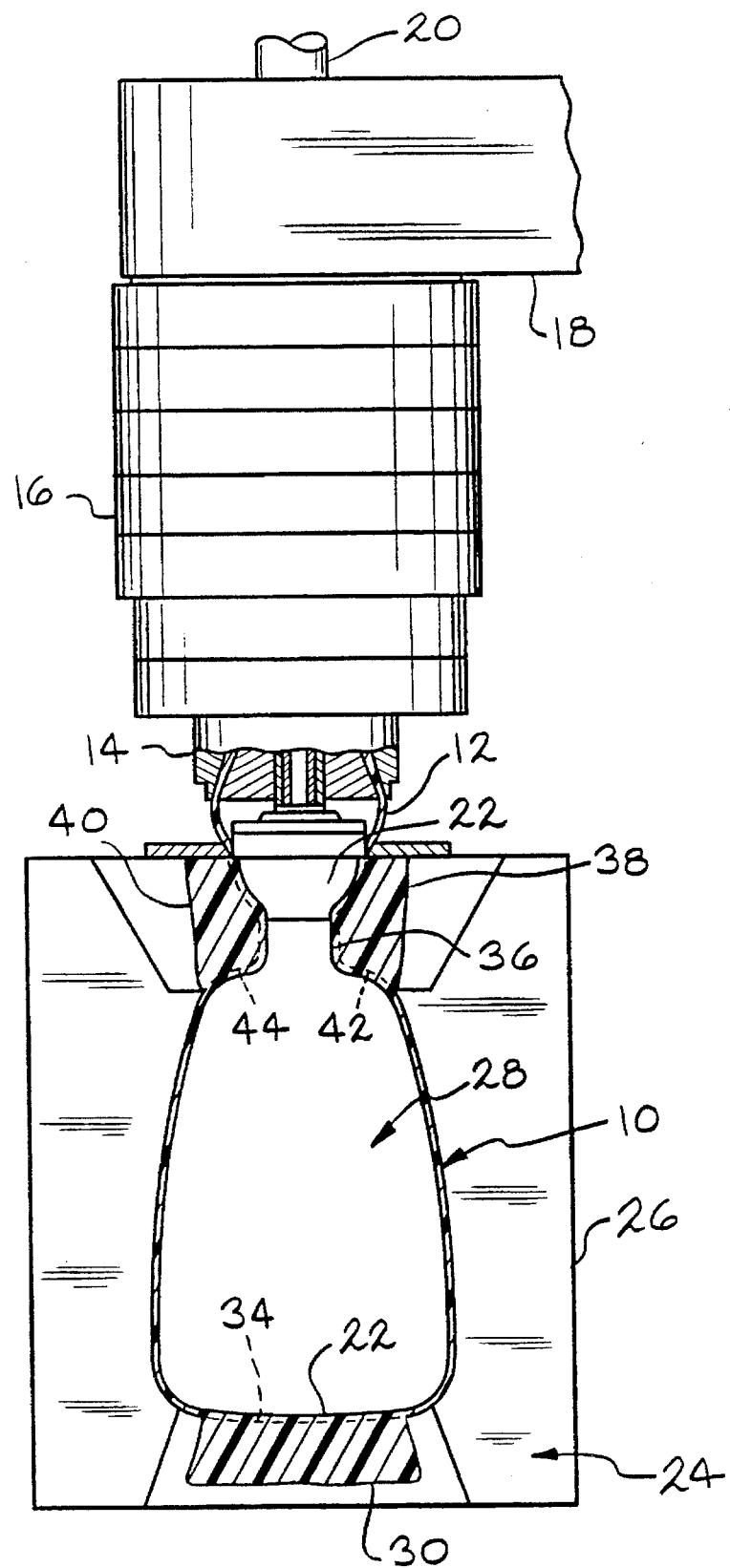
FIG. 1 is an elevational view of the blow molding of a container from an extruded parison.

With reference to FIG. 1, a container 10 is shown in the process of being blow molded, after which the unwanted flash portions will be removed by the method of the present invention. The container 10 is blow molded from a plastic parison 12 that is extruded from a die 14 coupled to an extrusion diehead 16. The diehead 16 receives molten resin from an extruder 18 in a conventional manner for extrusion blow molding. The diehead includes a blow pin 20 with a blow nozzle 22 at its lower end for blow molding the parison, as described below.

The container 10 is molded in a mold 24 having a pair of mold halves, only one mold half 26 is shown. The mold halves form a hollow cavity 28, upon closing, in which the container is molded. The mold halves close upon the extruded parison 12 after which the blow pin is lowered into the upper end of the mold to the position shown in FIG. 1, in which the parison is pressed into the neck region of the mold. A pressurizing medium is then injected into the parison through the blow nozzle 22 forcing the parison outward against the walls of the cavity 28 to form the container 10.

At the bottom of the cavity 28, the mold is closed upon the parison, forming a tail flash 30 extending below the bottom wall 32 of the container 10. The tail flash 30 is formed by collapsing the parison upon itself below the mold cavity 28. The tail flash is twice as thick as the parison wall. The tail flash 30 is joined to the container bottom wall at a pinch line 34 formed by relatively sharp mating knife edges of the two mold halves. This produces a weakened line joining the tail flash 30 to the bottom wall 32 of the container 10.

In addition to the tail flash, in the neck region 36 of the container, where the container diameter is less than the diameter of the extruded parison, flash portions 38, 40 are formed where the mold halves close upon a portion of the parison. The flash portions are formed by flattening the parison upon itself, producing flash portions having a thickness approximately twice that of the extruded parison. The flash portions 38, 40 are joined to the molded container along weakened lines 42, 44 formed by pinching the parison with mating knife edges in the mold.

The molded container 10 is shown in FIGS. 2 and 3 upon removal from the mold 24. The flash portions 38, 40 remain joined to the molded container 10. The molded container 10 includes an opening 46 at its upper end. The particular container shown is a hot water bottle made of an elastomer such as vinyl and is soft, flexible and elastic.

The flash portions 30, 38, 40 are removed by the method of the present invention by first gripping each of the flash portions to hold them stationary. With reference to FIGS. 4 and 5, the flash portions are shown gripped by clamps 48, 50, 54, respectively. As shown in FIG. 5, the clamp 48 includes a pair of jaws 54, one on each side of the flash portion 30, while the clamp 50 includes a pair of jaws 56, one on each side of the flash portion 38.

With the flash portions held stationary, a fluid flow nozzle 58 is inserted into the opening 46 at the upper end of the container 10. In FIGS. 4 and 5, a fluid is being inserted through the nozzle 58 into the container, inflating the container 10 and moving the container walls outwardly. This movement of the container walls, while the flash portions are held stationary, results in relative movement between the container 10 and the flash portions. This relative movement at least partially tears the flash portions from the container. This separation is shown at both ends of the tail flash 30 (designated by 60), and shown at the lower ends of the flash portions 38, 40 (designated by 62).

Figure 6:
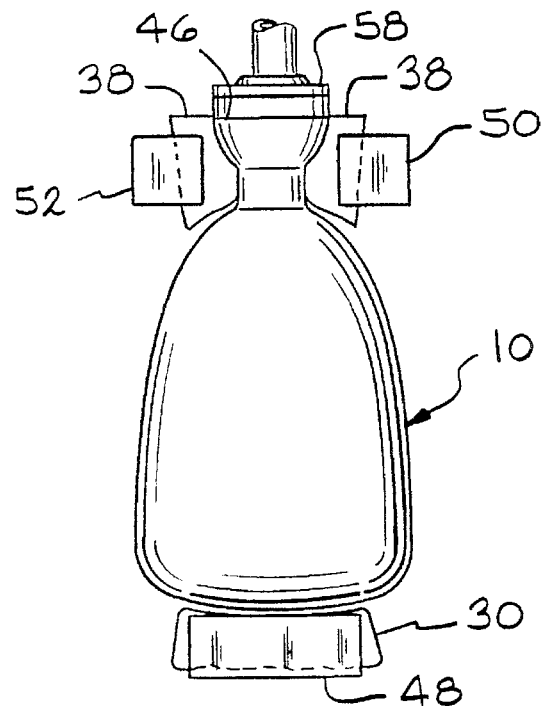
FIG. 6 is a front elevational view similar to FIG. 4, illustrating the lower flash portion being entirely removed upon inflation of the container.

Removal of the flash portions in this manner is made possible due to the greater stiffness of the flash portions relative to the walls of the container. This is due to the fact that the flash portions are twice as thick as the extruded parison while the walls of the container, depending upon the particular location in the container, are thinner than the extruded parison, due to the stretching of the parison in the blow molding process. Depending upon the configuration of the container and the location of the flash portions, the flash portions may be only partially removed from the container as shown in FIG. 4, or they may be entirely removed from the container as shown in FIG. 6 with the tail flash 30. The neck flash portions will likely be partially torn from the container. Since the fluid flow nozzle is inverted into the open end of the bottle, little movement of the container walls is possible near the opening. There may be insufficient movement for the flash to be removed.

Figures 7, 8:
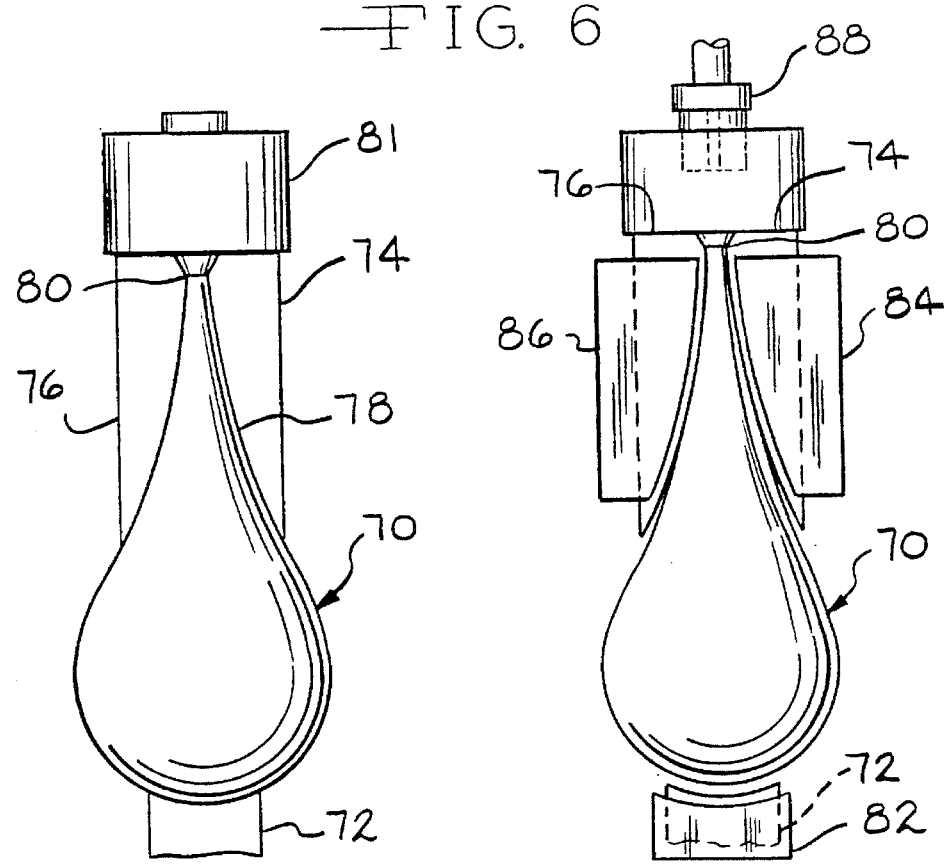
FIG. 7 is a side elevational view of another container configuration as removed from the mold with mold flash.
FIG. 8 is a side elevational view of the container shown in FIG. 7 with the mold flash being removed by gripping the mold flash and deflating the container.

Depending upon the specific configuration of the container, it may be possible to remove the flash portions by deflation of the container rather than inflation. Removal by deflation is shown in FIGS. 7 and 8 with respect to a container 70 which is an ear syringe. The container 70 is molded with a tail flash portion 72 and neck flash portions 74, 76 adjacent the narrower neck 78 of the container. As molded, the container has a dome 81 at the upper end. The dome is removed leaving a syringe with a small opening 80 at its upper end. In FIG. 8, the flash portions 72, 74, 76 are shown gripped by clamps 82, 84, 86 to hold the flash portions stationary. A fluid flow nozzle 88 is inserted into the dome 81 and air is withdrawn from the container 70 deflating the container to reduce its size and pull the container walls away from the flash portions. This tears the flash portions from the container.

Deflation of a container is appropriate with a container such as an ear syringe in which the container, while being flexible and elastic, is rigid enough to retain its shape. Upon deflation, the container walls all move generally inwardly and pull away from the mold flash. In contrast, the hot water bottle represented by container 10 does not retain its shape. The container side walls 33, 35 will collapse upon themselves when the container is laid flat. Because the container 10 does not retain its shape, if the container was deflated, the two side walls 33, 35 would collapse upon themselves rather than moving the bottom wall 32 inwardly away from the stationary mold flash 30. As a result, with a container that is not self-supporting, it is likely that only inflation of the container can be used to remove the mold flash.

The method of the present invention is useful with containers made of an elastomer or other resins exhibiting some degree of elastomeric properties enabling the container to be flexible and be somewhat elastic. This is necessary since the method relies upon flexing of the container walls.

It is to be understood that the invention is not limited to the exact construction illustrated and described above, but that various changes and modifications may be made without departing from the spirit and scope of the invention as defined in the following claims.

I claim:

1. A method for producing a molded plastic container and for removing an unwanted flash portion, the plastic container having walls and being molded to a predetermined size and having an opening therein, the method comprising the steps of:

molding the plastic container having a closed lower end in a mold forming the flash portion joined to the plastic container along a weakened line and extending from the lower end;

removing the container from the mold;

gripping the flash portion to hold the flash portion stationary;

inserting a fluid flow nozzle into the opening in the plastic container; and passing a fluid through the nozzle to change the size of the container from the predetermined size to move the walls of the container while the flash portion is held stationary whereby the flash portion is at least partially torn away from the plastic container along the weakened line.

2. A method for producing a molded plastic container, said plastic container having walls and being molded to a predetermined size and shape and having an opening therein, the method comprising the steps of:

extruding a parison of an elastomeric resin;

closing a mold upon the parison, the mold having a cavity complementary to the predetermined size and shape of the container, the mold, upon closing, pinching portions of the parison together outside of the cavity forming a flash portion joined to the parison by a weakened line;

blow molding the parison to form the plastic container in the mold with the flash portion joined to the plastic container along the weakened line;

removing the container from the mold; and subsequently gripping the flash portion to hold the flash portion stationary;

inserting a fluid flow nozzle into the opening in the plastic container; and passing a fluid through said nozzle to inflate or deflate the container to change the size of the container from said predetermined size to move the walls of the container while the flash portion is held stationary whereby the flash portion is at least partially torn away from the plastic container along the weakened line.

3. The method of claim 2 wherein fluid is inserted into said container through said nozzle to inflate said container and expand the size thereof.

4. The method of claim 3 wherein fluid is removed from said container through said nozzle to deflate said container and reduce the size thereof.

* * * * *